US011958179B2

(12) United States Patent
Huber et al.

(10) Patent No.: US 11,958,179 B2
(45) Date of Patent: Apr. 16, 2024

(54) APPARATUS FOR RECEIVING A FUNCTIONAL UNIT FOR A POWER TOOL AND METHOD FOR FASTENING A RECEIVING APPARATUS OF THIS KIND TO A POWER TOOL

(71) Applicant: Hilti Aktiengesellschaft, Schaan (LI)

(72) Inventors: Franz Huber, Oberneufach (DE); John Van Taack-Trakranen, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 208 days.

(21) Appl. No.: 17/441,102

(22) PCT Filed: Mar. 26, 2020

(86) PCT No.: PCT/EP2020/058455

§ 371 (c)(1),
(2) Date: Sep. 20, 2021

(87) PCT Pub. No.: WO2020/207806

PCT Pub. Date: Oct. 15, 2020

(65) Prior Publication Data

US 2022/0168882 A1 Jun. 2, 2022

(30) Foreign Application Priority Data

Apr. 8, 2019 (EP) .................................... 19167791

(51) Int. Cl.
*B25F 5/02* (2006.01)

(52) U.S. Cl.
CPC ..................................... *B25F 5/02* (2013.01)

(58) Field of Classification Search
CPC ......................................................... B25F 5/02
See application file for complete search history.

(56) References Cited

U.S. PATENT DOCUMENTS 4,564,322 A * 1/1986 Stapley ................ B25H 1/0085 408/16
4,655,380 A * 4/1987 Haytayan ................ B25F 5/021 227/9

(Continued)

FOREIGN PATENT DOCUMENTS

DE 212017000114 U1 12/2018
EP 1522389 A1 4/2005

(Continued)

OTHER PUBLICATIONS

International Search Report of PCT/EP2020/058455, dated Jul. 7, 2020.

*Primary Examiner* — Anna K Kinsaul
*Assistant Examiner* — Lucas E. A. Palmer
(74) *Attorney, Agent, or Firm* — Davidson, Davidson & Kappel, LLC

(57) ABSTRACT

An apparatus for receiving a functional unit for a power tool, wherein the receiving apparatus can be fastened to the power tool by way of a fastening mechanism. A second aspect of the invention relates to a method for fastening a receiving apparatus of this kind to a power tool. In the fastening mechanism, a rotatable insert part can be inserted into an opening of the receiving apparatus and can be moved from an unfastened to a fastened state by this rotational movement. In the fastened state, a hook of the power tool engages with a raised portion of the insert part.

16 Claims, 10 Drawing Sheets

(56) References Cited

U.S. PATENT DOCUMENTS

| | | | | | | |
|---|---|---|---|---|---|---|
| 4,973,205 | A | * | 11/1990 | Spaulding | B25F 5/021 | 408/16 |
| 5,074,081 | A | * | 12/1991 | Beth | B24B 23/005 | 403/381 |
| 5,604,958 | A | * | 2/1997 | Anscher | A45C 7/0086 | 24/165 |
| 5,888,031 | A | * | 3/1999 | Buck | B25F 5/026 | 408/110 |
| 5,954,458 | A | * | 9/1999 | Lee | B25B 23/18 | 408/16 |
| 6,059,156 | A | * | 5/2000 | Lehtinen | H04B 1/3833 | 248/225.11 |
| 6,364,580 | B1 | * | 4/2002 | Dils | B25F 5/029 | 408/16 |
| 6,443,675 | B1 | * | 9/2002 | Kopras | B25F 5/026 | 409/137 |
| 6,499,172 | B1 | * | 12/2002 | McCracken | B24B 23/005 | 15/97.1 |
| 6,502,647 | B1 | * | 1/2003 | Krzyzewski | B25F 5/02 | 173/168 |
| 6,851,487 | B1 | * | 2/2005 | Shotey | B25F 5/00 | 173/171 |
| 7,093,742 | B2 | * | 8/2006 | Steven, III | A45F 5/02 | 224/669 |
| 8,360,597 | B1 | * | 1/2013 | Hanchett | F21V 17/02 | 362/190 |
| 9,457,461 | B2 | * | 10/2016 | Francis | B23Q 13/00 | |
| 10,258,136 | B2 | * | 4/2019 | Fiorello | A45F 5/021 | |
| 2001/0053313 | A1 | * | 12/2001 | Luebke | G01V 3/15 | 408/124 |
| 2002/0054798 | A1 | * | 5/2002 | Dils | G01V 3/15 | 408/124 |
| 2002/0122707 | A1 | * | 9/2002 | Sakai | B25B 23/045 | 224/268 |
| 2005/0069391 | A1 | * | 3/2005 | Dils | G01V 3/15 | 408/16 |
| 2005/0076450 | A1 | * | 4/2005 | Fischer | B25H 7/04 | 7/164 |
| 2005/0081364 | A1 | * | 4/2005 | Kopras | B25F 5/029 | 29/560 |
| 2005/0247460 | A1 | * | 11/2005 | Luebke | H01L 21/76829 | 173/2 |
| 2006/0022002 | A1 | * | 2/2006 | Marks | A45F 5/00 | 224/268 |
| 2006/0104735 | A1 | * | 5/2006 | Zeiler | B25F 5/021 | 173/217 |
| 2013/0058711 | A1 | * | 3/2013 | Van Der Linde | B25F 5/02 | 403/349 |
| 2015/0041166 | A1 | * | 2/2015 | Van Der Linde | F16C 11/10 | 173/29 |
| 2015/0122526 | A1 | * | 5/2015 | Bernardi | B25F 5/021 | 33/630 |
| 2017/0106525 | A1 | * | 4/2017 | Brauer | B25G 1/06 | |
| 2018/0281135 | A1 | * | 10/2018 | Wierzchon | B23Q 9/0028 | |
| 2020/0147778 | A1 | * | 5/2020 | Tam | B23D 49/162 | |
| 2020/0164499 | A1 | * | 5/2020 | Zhou | B25F 5/02 | |
| 2021/0180912 | A1 | * | 6/2021 | Brauer | B25F 5/026 | |
| 2021/0205976 | A1 | * | 7/2021 | Matei | G08B 7/06 | |

FOREIGN PATENT DOCUMENTS

| | | | |
|---|---|---|---|
| GB | 2354963 | A | 4/2001 |
| GB | 2423039 | A | 8/2006 |
| JP | 2004209642 | A | 7/2004 |
| JP | 2005509535 | A | 4/2005 |
| JP | 2013086228 | A | 5/2013 |

* cited by examiner

APPARATUS FOR RECEIVING A FUNCTIONAL UNIT FOR A POWER TOOL AND METHOD FOR FASTENING A RECEIVING APPARATUS OF THIS KIND TO A POWER TOOL

BACKGROUND

The present invention relates to an apparatus for receiving a functional unit for a power tool, wherein the receiving apparatus can be fastened to the power tool by way of a fastening mechanism. A second aspect of the invention relates to a method for fastening a receiving apparatus of this kind to a power tool.

SUMMARY OF THE INVENTION

Various methods are known in the prior art for fastening functional units, such as line laser devices for example, to power tools. For example, it is proposed in the prior art to adhesively bond, screw and/or attach line laser devices to the power tools. However, it has been found —for example due to warping, which can easily occur during production of the corresponding components—deviations and inaccuracies can occur as a result. Particularly if the functional unit is a line laser device, imprecise representations of the desired projection target can result, and these can lead to the power tool not being guided in an optimal straight line. Non-straight line guidance can lead to inaccurate work results which have to be reworked or repeated if necessary.

Furthermore, projection sharpness can be lost owing to vibrations at the fastening point between the functional unit and the power tool. This can happen particularly if the functional unit becomes detached from the power tool and is no longer fastened in a stable manner. A further disadvantage of the permanently fitted functional units is that a system of this kind comprising a functional unit and a power tool necessarily has, owing to the functional unit being permanently carried along, a higher overall weight than easily removable functional units which can be fitted to the power tool only when required.

An object of the present invention is to overcome the above-described disadvantages of the prior art and to provide a fastening solution by way of which a functional unit can be releasably connected to a power tool. The fastening solution to be provided should lead to a reduction in the weight of the system comprising the functional unit and the power tool and, furthermore, should allow the functions of the functional unit to be performed in a particularly precise manner. If the functional unit is a line laser device, the fastening solution to be provided should allow precise projection of the emitted laser beam onto the desired projection target, so that the power tool can achieve an optimal, precise work result based on the projected beam.

The invention provides an apparatus for receiving a functional unit for a power tool, wherein the apparatus can be fastened to the power tool. The apparatus is preferably also referred to as a receiving apparatus and is characterized in that the apparatus comprises a fastening mechanism, wherein the fastening mechanism comprises an opening in the apparatus and a rotatable insert part which can be inserted into the opening, wherein the opening is formed by a bore on a side which is averted from the power tool and the apparatus comprises a slot for receiving a hook on a side which faces the power tool, wherein the hook is present on the power tool and, in a fastened state, is in engagement with a raised portion of the insert part for fastening the apparatus to the power tool.

An apparatus by way of which a functional unit can be fastened to a power tool in a particularly stable and secure manner can be provided by the invention. The fastening mechanism ensures unexpected stability of the fastening and effective protection against displacement and undesired slipping of the receiving apparatus and the functional unit which is located therein. These advantages are achieved, in particular, in that the hook of the power tool can engage with the raised portion of the insert part in the fastened state. It is preferred within the meaning of the invention for this fastening to be able to be combined with a dovetail connection in order to further increase the stability of the connection. The receiving apparatus preferably comprises a cutout for forming this dovetail connection. It has been found that, in particular, the dovetail connection ensures lateral slip protection of the apparatus with respect to the power tool as well as effective protection against vibration, The functional unit may be, for example, a line laser device. A line laser device is preferably designed to emit a laser beam with which, for example, a projection target can be located. The power tool can follow the emitted laser beam, which preferably forms a straight line, as a result of which a working track which likewise corresponds to a straight line is advantageously produced. It is preferred within the meaning of the invention for the receiving apparatus to have a cavity for receiving the functional unit for the power tool in a front region. This cavity can constitute, in particular, a cavity for receiving the line laser device. The cavity for receiving the line laser device is preferably formed in a transition region between two halves of the apparatus that correspond to one another. It is particularly preferred within the meaning of the invention for the apparatus to have, in the front region, an opening through which the laser light which is emitted by the line laser device can be conducted. The opening is preferably closed by a preferably disk-shaped material which is transparent to the laser light, so that the line laser device is protected against soiling and damage. The line laser device preferably comprises a laser light source with which a laser beam can be generated. In other words, the line laser device is preferably designed to emit a, preferably linear, thin laser beam which is used to guide a work process which is executed by the power tool to which the line laser device can be fastened. In other words, the power tool can be used to follow a laser line, which is drawn by the line laser device, for example in order to produce a straight slot if the power tool is a slot cutter or an angle grinder. The receiving apparatus can also be fastened to saws, cutters, cutting devices, severing devices or saws, such as handheld circular saws, reciprocating saws or ring saws. In particular, use of power tools of this kind in which work is carried out along a substantially straight line and in which guidance by a laser beam is desirable is preferred.

It is preferred within the meaning of the invention for a target to be able to be located by the line laser device and for the power tool to be able to follow this locating line when working. If, for example, a slot for laying a power cable to a plug socket or to a switch is intended to be produced in a wall, the plug socket or the switch can be located by the laser beam of the line laser device. During the working or the slotting process, the working means of the power tool, for example a cutting disk or a chisel, can then follow the course of the laser light beam and thereby produce a particularly straight and smooth slot. Depending on the power tool used, the work means can be, for example, diamond disks, cutting disks, saw blades, chisels, drill bits, saw chains, saw cables and/or grinding chains, without being restricted to these.

For generating the laser beam and for following the laser beam with the power tool, it is necessary for the laser light source to be fastened to the power tool in a particularly stable and wobble-free manner. In the context of the present invention, this is achieved, in particular, by providing the fastening mechanism and its configuration according to the invention. By way of providing a fastened and an unfastened state, the fastening mechanism allows the connection between the apparatus and the power tool to be released, so that the receiving apparatus can be fitted or removed in a particularly simple manner, depending on the requirements of the user.

In the fastening mechanism, which can preferably be released in a simple manner, an insert part can be inserted into an opening of the receiving apparatus. The receiving apparatus preferably comprises a basic body which is formed by two parts which correspond to one another. It is preferred within the meaning of the invention for a first side or half of the receiving apparatus or of the basic body to be averted from the power tool and for a second side or half of the receiving apparatus or of the basic body to face the power tool. The two side parts of the receiving apparatus are preferably also referred to as halves which correspond to one another. Within the meaning of the invention, the term "designed to correspond to one another" preferably does not mean that the two apparatus halves have to be designed to be congruent or symmetrical to one another. The term preferably indicates that the halves are designed such that they are formed in a transition region in relation to one another such that the two halves can be placed one on top of the other in a particularly simple and uncomplicated manner in order to obtain the substantially closed basic body of the receiving apparatus. In particular, the edges of the two apparatus halves, which preferably form the transition region between the halves, are matched to one another, so that, for example, the second half of the basic body can be inserted into the first half of the main body. It is within the meaning of the invention for the two basic body halves to be able to be connected to one another by fastening means. For example, writing can be used to obtain a threaded connection between the halves of the receiving apparatus.

The present invention provides, in particular, a particularly stable fastening solution with which a functional unit can be securely fastened to a power tool. If the fastening mechanism is combined with an additional dovetail connection, a "double" fastening solution can advantageously be provided for the functional unit. Within the meaning of the invention, the term "double" preferably means that, in the context of the fastening solution, a dovetail connection is combined with the fastening mechanism in order to ensure particularly stable and vibration-resistant fastening. In a particularly preferred embodiment of the invention, an additional component, such as the functional unit or an accessory, can be attached to a power tool. The power tool may be, for example, a slot device with which, for example, slots can be cut into walls in order to lay cables therein. The double fastening advantageously ensures that the functional unit is fitted to the power tool at the correct angle and in the correct position. Furthermore, the fastening solution ensures that the vibrations which act on the functional unit are minimized. This constitutes a substantial advantage of the present invention since, in this way, the mechanical loads on the optical system and the internal electronics system of the functional unit can be considerably reduced.

A further advantage of the invention is that the functional unit can be fastened to the power tool in a particularly rapid manner and practically without tools. This makes it possible to fit the functional unit to the power tool only in the work phases in which, for example, the projection of a laser beam is required for using the power tool. This allows the power tool to be used without the functional unit at all other times. As a result, the weight of the power tool in these work phases in which the tool is used without the functional unit can be significantly reduced in comparison to those power tools in which the functional unit is permanently fitted or is integrated into the power tool. In particular, the invention allows weight-optimized working with the power tool. Owing to the two-sided fastening approach, the invention further allows dimensional fluctuations in the production of the receiving apparatus due to resulting tension conditions to be compensated for. Owing to the fastening, in particular, manufacturing-related measurement inaccuracies can be compensated for and therefore the laser light can be positioned in an extremely exact manner.

In a preferred exemplary embodiment, the invention comprises a preferably T-shaped carrier or pin which can be arranged in a front region of the power tool or on an end side of the power tool. In alternative configurations of the inventions, V-shaped or U-shaped pins can also be used. The use of a carrier or pin on the power tool, which carrier or pin interacts with a cutout on the functional unit, preferably leads to the formation of a dovetail connection mechanism which, in the context of the invention, can interact with the fastening mechanism in order to enable stable fastening of the functional unit with minimized transmission of vibrations to the functional unit. It is preferred within the meaning of the invention that the pin on the power tool is clasped by the cutout of the functional unit.

In an exemplary embodiment of the invention, it is preferred for the insert part to be inserted into the opening of the receiving apparatus when the two halves of the apparatus are not connected to one another. When a customer purchases the receiving apparatus, the two halves of the receiving apparatus are preferably connected to one another and the insert part is located within the receiving apparatus. In other words, it is preferred within the meaning of the invention for the insert part to be located in a preferably hollow interior of the receiving apparatus, in particular in the opening of the receiving apparatus. The insert part preferably has a cylindrical basic body, so that it can be rotated in the hollow-cylindrical opening of the receiving apparatus that is preferably at least partially designed as a bore.

It is preferred within the meaning of the invention for the insert part to comprise a slot by way of which the insert part can be rotated in the opening, wherein the slot is arranged on the side of the insert part that is averted from the raised portion. It is preferred within the meaning of the invention for the slot of the insert part to be visible in the opening on the side of the receiving apparatus that is averted from the power tool. It is furthermore preferred within the meaning of the invention for the insert part to be movable from the fastened to an unfastened state, or vice versa, by a rotation process in the opening or the bore of the receiving apparatus. The insert part preferably has a raised portion which faces the power tool when the insert part is located in the receiving apparatus. It is preferred within the meaning of the invention for the power tool to comprise a hook for fastening the receiving apparatus to the power tool. This hook can be arranged, for example, on a side surface or on an top side of the power tool. The fastened state is preferably characterized in that the hook of the power tool is in engagement with the raised portion of the insert part. In the fastened state, the receiving apparatus is preferably connected to the power tool and can be moved together with it. The unfastened state is preferably characterized in that the hook of the power tool is not in engagement with the raised portion of the insert part. As a result, the proposed fastening mechanism advantageously has no fastening effect between the receiving apparatus and the power tool in the unfastened state, and the receiving apparatus can be removed, detached or disconnected from the power tool. The receiving apparatus can be detached, in particular, by also releasing the additional dovetail connection by way of, for example, lifting away or pulling away the receiving apparatus upward from the pin as a counterpart of the dovetail slot.

It is preferred within the meaning of the invention for the front region of the receiving apparatus to have a substantially trapezoidal basic shape when viewed from the side. Within the meaning of the invention, the short trapezoidal top side preferably points forward, while the longer trapezoidal bottom side faces the power tool. The power tool preferably has a substantially planar end side to which the receiving apparatus can be fastened. The power tool preferably has a pin on the front or end side, wherein this pin is designed to form a dovetail connection together with the cutout of the receiving apparatus.

The proposed receiving apparatus interacts with constituent parts of the power tool, in particular with the pin on the end side of the power tool and the hook which is required for the fastening mechanism. However, these constituent parts of the power tool, in particular the pin and the hook, are not constituent parts of the receiving apparatus. However, it is particularly preferred within the meaning for the shape of the pin to correspond to the shape of the corresponding cutout on the receiving apparatus or for the shapes to be matched to one another. It is furthermore preferred within the meaning of the invention for the shape of the hook of the power tool and the shape of the raised portion of the insert part to be matched to one another or to be designed in a manner corresponding to one another.

It is preferred within the meaning of the invention for the cutout for forming a dovetail connection to lie on a rear side of the front region of the apparatus. It is particularly preferred within the meaning of the invention for the rear side of the front region of the receiving apparatus to face the power tool. As a result, the slot of the receiving apparatus can advantageously interact with the pin of the power tool, so that particularly effective lateral slip protection of the receiving apparatus and effective protection against vibration can be provided by the invention.

In a further preferred refinement of the invention, the cutout for forming a dovetail connection tapers over its course. It is very particularly preferred within the meaning of the invention for the dovetail cutout on the receiving apparatus to taper from an insertion opening on a bottom side of the front region of the apparatus to one end of the cutout. In other words, the cutout for forming a dovetail connection becomes narrower from the insertion opening to its end. The power tool preferably has a corresponding elongated pin which corresponds to the tapering shape of the dovetail cutout. In a sectional illustration through the dovetail cutout, the cutout has the shape of a letter “T”. It is preferred within the meaning of the invention for both the lower region of this preferably T-shaped cutout and also the upper bar region to taper from bottom to top or become narrower over their course. This advantageously prevents the receiving apparatus from undesirably sliding off or detaching from the power tool. In particular, the tapering design of the dovetail connection effectively prevents the receiving apparatus from slipping upward or downward.

It is preferred within the meaning of the invention for the receiving apparatus to comprise at least one switch for controlling the functional unit for the power tool. Said switch can preferably be a switch for switching the functional unit on and off. If the functional unit is formed, for example, by a line laser, the switch can be designed to switch the line laser on and off. The switch can preferably be designed as a pushbutton switch. However, other switch geometries and operating principles can also be used in the context of the present invention. It is particularly preferred within the meaning of the invention for the switch to be arranged on a top side of the receiving apparatus since it can be operated there particularly easily by the user of the power tool. However, it may also be preferred for the at least one switch to be arranged on a front side, side surface and/or rear side of the apparatus if, for example, special geometries of the power tool or its handle make this necessary.

In a further preferred refinement of the invention, the slot for receiving the hook of the power tool has non-parallel boundary edges. This slot is preferably present on a side of the receiving apparatus that is averted from the power tool. The expressions “averted from the power tool” and “faces the power tool” preferably refer to a state in which the receiving apparatus is fitted to the power tool. It is preferred within the meaning of the invention for the receiving apparatus and the power tool to be able to be present both in the fitted state, i.e. in the state in which they are connected to one another, and also separately, i.e. separately from one another. It is preferred within the meaning of the invention for the two boundary edges, which form the receiving slot, to be at a greater distance from one another in a lower opening region than in an upper region of the receiving apparatus. In other words, the slot for receiving the hook, which is preferably present on the receiving apparatus, also tapers in the context of the present invention. This tapering advantageously serves for guiding the hook of the power tool into the upper region of the receiving apparatus, where the hook can be moved to the fastened state by a rotational movement, by way of the hook being able to engage with the raised portion of the insert part.

It is preferred within the meaning of the invention for a portion of the slot on the side which faces the power tool to be covered by an undercut. The raised portion of the insert part can remain in this undercut region, for example, in the fastened state of the receiving apparatus.

In a further refinement of the invention, it is preferred for a centering disk segment to be arranged in the opening of the apparatus, wherein the centering disk segment has a guide opening. This guide opening preferably has a diameter which is smaller than the diameter of the opening of the receiving apparatus. Furthermore, the centering disk segment has a ring segment, wherein the ring segment of the centering disk segment covers approximately ⅔ of a full circle.

It is preferred within the meaning of the invention for the raised portion of the insert part to be designed such that the raised portion can be moved in the free third of a full circle of the centering disk segment. This movement is, in particular, a rotary back-and-forth movement or a back-and-forth rotational movement which the insert part can execute in the opening of the receiving apparatus. The receiving apparatus can preferably be moved from an unfastened to a fastened state, or vice versa, by the rotational movement of the raised portion of the insert part within the free portion of the centering disk segment. A tool, such as a flat-blade screwdriver for example, can be in order to cause the rotational movement with which the insert part can be moved from the fastened to the unfastened state. However—depending on availability—a coin or a fingernail can also be used in order to rotate the insert part in the opening of the receiving apparatus and to thereby fasten the receiving apparatus to the power tool. It is particularly preferred within the meaning of the invention for the centering disk segment to be formed from the same material as the apparatus. However, in alternative embodiments, it may also be preferred for the centering disk segment to consist of a different material or to comprise a different material.

A second aspect of the invention relates to a method for fastening a receiving apparatus for a functional unit to a power tool, wherein the method comprises the following steps:

a) providing a receiving apparatus in an unfastened state, wherein the unfastened state of the receiving apparatus is defined by a position of an insert part in the receiving apparatus,
b) inserting a pin of the power tool into a cutout of the receiving apparatus,
c) inserting a hook of the power tool into a slot of the receiving apparatus,
d) rotating the insert part within the receiving apparatus, so that the receiving apparatus is moved from an unfastened to a fastened state and a connection between the power tool and the receiving apparatus is obtained.

The terms, definitions and technical advantages introduced for the receiving apparatus preferably apply analogously to the method for fastening the receiving apparatus to a power tool. It is preferred within the meaning of the invention for the receiving apparatus to initially be separate from the power tool to which the apparatus is intended to be fastened. The raised portion of the insert part is preferably at a stop in the free third of the full circle of the centering disk segment. Owing to a rotational movement of the insert part, the raised portion can be moved from a first stop on one side of the free third of the full circle of the centering disk segment to a second stop on the other side of the free third of the full circle of the centering disk segment. Owing to this rotational movement, the insert part is preferably moved from an unfastened to the fastened state.

If the receiving apparatus is intended to be fastened to the power tool, the receiving apparatus, the insert part of which is preferably present in the unfastened state, is initially connected to the power tool preferably by forming the dovetail connection. For this purpose, the elongate pin, which is preferably arranged on an end side of the power tool, is inserted into a cutout of the receiving apparatus, wherein this cutout is preferably also referred to as a dovetail cutout of the receiving apparatus. Furthermore, the hook which is present on the power tool can be inserted into a lateral slot of the receiving apparatus, wherein the slot is present on the side of the receiving apparatus that faces the power tool. The slot preferably has lateral boundary edges which are not formed parallel to one another, but rather which run toward one another starting from an insertion opening. In other words, the slot, which is a constituent part of the fastening mechanism, tapers over its course.

It is preferred within the meaning of the invention for the receiving apparatus in the front region of the power tool to be pivoted into the T-groove or the pin and then pushed downward until a secure fit is achieved. Subsequently, the insert part, which is preferably also referred to as a fixing screw within the meaning of the invention, is preferably rotated clockwise through 90° until latching into place is sensed. The latching-in indicates that the raised portion of the fixing screw has engaged with the fastening contour of the power tool. As a result, the fastened state is assumed. The slot for receiving the fastening contour and the undercut advantageously allow particularly precise centering of the receiving apparatus, wherein centering becomes more and more precise as the hook is inserted into the slot since the slot tapers in a particularly preferred refinement of the invention. It is preferred within the meaning of the invention for an inner angle to describe the tapering of the slot as the opening angle.

Owing to rotation of the insert part in the opening of the receiving apparatus, the raised portion of the insert part, which is arranged on the side which faces the power tool, engages with the hook of the power tool. This rotational movement of the insert part takes place, in particular, in the opening of the receiving apparatus or in the interior of the substantially hollow receiving apparatus. It is preferred within the meaning of the invention for the position of the insert part within the opening or bore of the receiving apparatus to determine whether the receiving apparatus or the insert part is in the unfastened or in the fastened state.

Further advantages can be found in the following description of the figures. The figures, the description and the claims contain numerous features in combination. A person skilled in the art will expediently also consider the features individually and combine them to form useful further combinations.

BRIEF DESCRIPTION OF THE DRAWINGS

In the figures, components which are the same and components of the same type are denoted by the same reference signs. In said figures.

DETAILED DESCRIPTION

Figure 1:
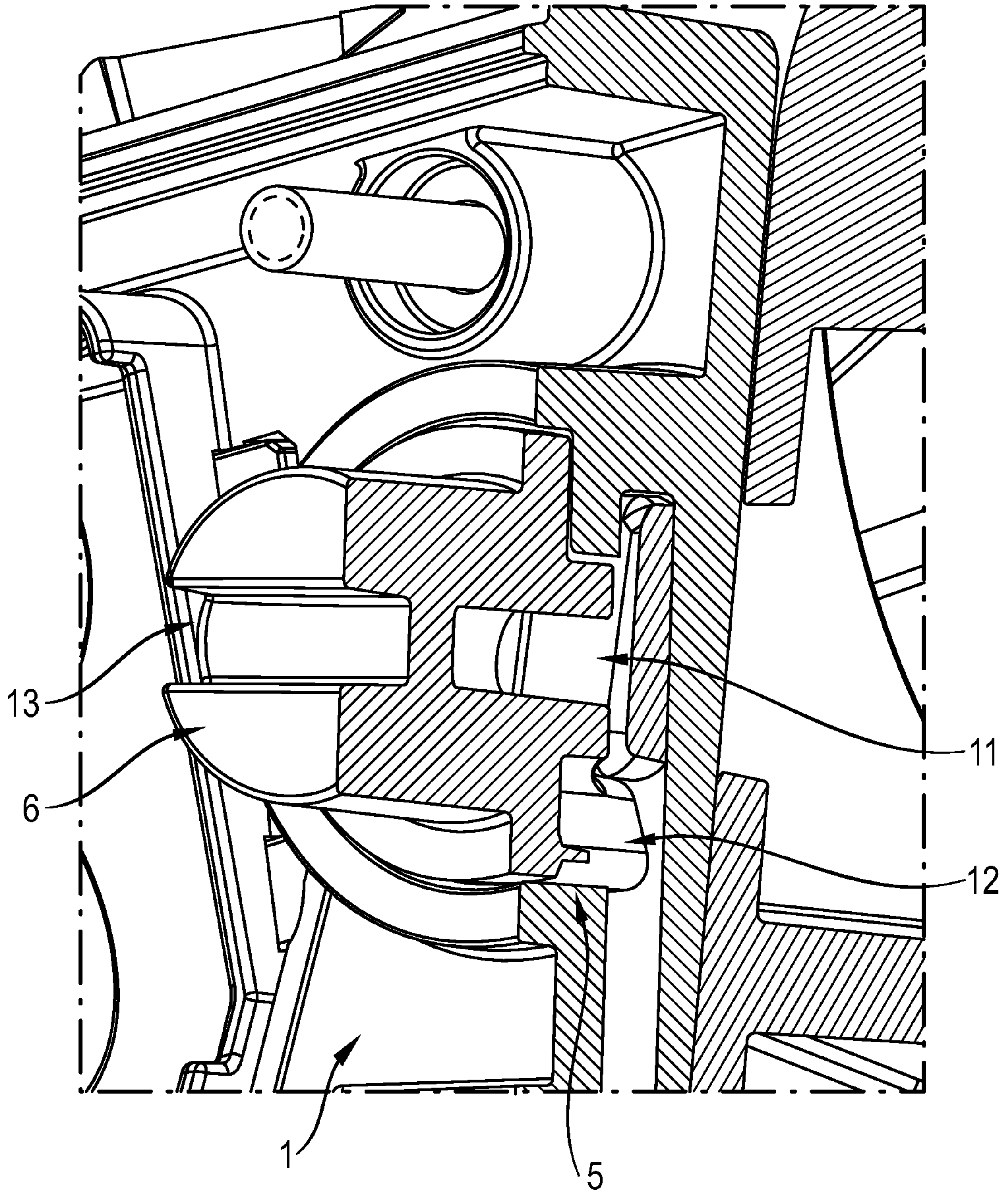
FIG. 1 shows a view of a preferred refinement of the insert part

The figures will be used with a preferred embodiment to describe the method disclosed above for fastening a receiving apparatus (1) for a functional unit (2) to a power tool (3), wherein the method comprises the following steps:

a) providing a receiving apparatus (1) in an unfastened state, wherein the unfastened state of the receiving apparatus (1) is defined by a position of an insert part (6) in the receiving apparatus (1), b) inserting a pin (22) of the power tool (3) into a cutout (4) of the receiving apparatus (1),
c) inserting a hook (11) of the power tool (3) into a slot (10) of the receiving apparatus (1),
d) rotating the insert part (6) within the receiving apparatus (1), so that the receiving apparatus (1) is moved from an unfastened to a fastened state and a connection between the power tool (3) and the receiving apparatus (1) is obtained.

FIG. 1 shows a view of a preferred refinement of the insert part (6) which, together with an opening (5) of the receiving apparatus (1) and a hook (11) of the power tool (3), forms the fastening mechanism. In the fastened state, the hook (11) engages with a raised portion (12) of the insert part (6), wherein the insert part (6) is rotatably mounted in the opening (5) of the receiving apparatus (1) and can be moved from a fastened to an unfastened state by a rotational movement. The opening (5) on the receiving apparatus (1) is formed by a bore (9) on a side (7) of the receiving apparatus (1) that is averted from the power tool (3)(see, e.g., FIG. 6), while a slot (10) for receiving the hook (11) of the power tool (3) is present on a side (8) of the receiving apparatus (1) that faces the power tool (3)(see, e.g., FIG. 7). The hook (11) on the power tool (3) can preferably also be referred to as a fastening contour. In particular, an L-shaped fastening contour is shown in the figures. However, other shapes are also conceivable, such as shapes that correspond to the letters T, U, V, K, Z or N. It is preferred within the meaning of the invention for the diameter of the fastening contour (11) to increase from top to bottom.

Figure 2:
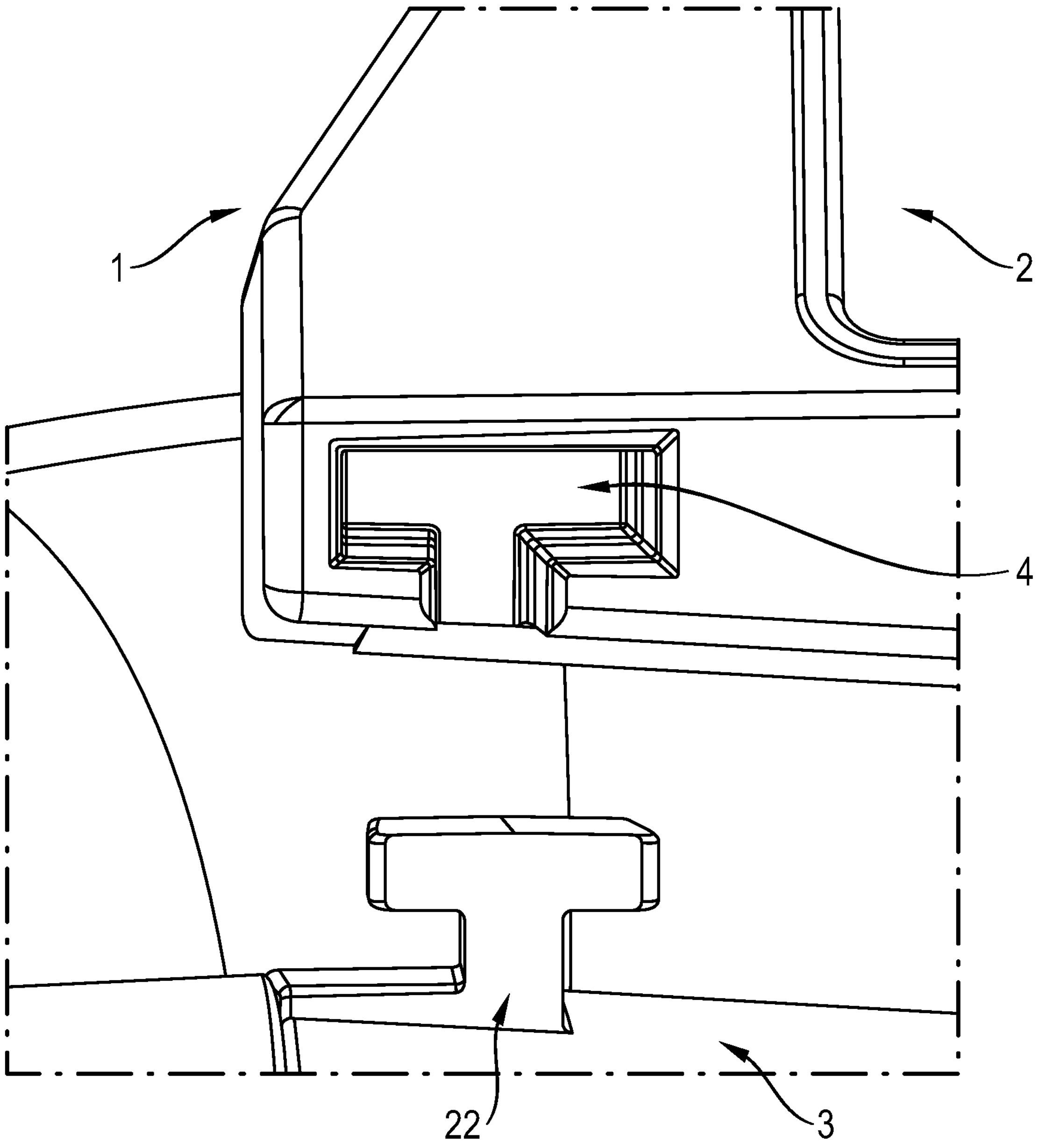
FIG. 2 shows a view of a preferred refinement of the dovetail connection, in particular the pin and the cutout

FIG. 2 shows a view of a preferred refinement of the preferred dovetail connection, in particular of the pin (22) and of the cutout (4). The pin (22) is preferably present on the power tool (3), for example in a front region which can preferably be oriented in the direction of a working movement of the power tool (3). The power tool (3) can preferably have, in its front region, an end side on which the pin (22) can be arranged. The pin (22) can, in particular, be T-shaped, wherein V, L, K, Z, N or U shapes are also conceivable. The pin (22) and the cutout (4) preferably taper over their course. It is particularly preferred within the meaning of the invention for the contour to increase in the dimensions from top to bottom, wherein this increase takes place, for example, in an angular range of between 0 and approximately 30 degrees.

A window is illustrated in the region at the top right in FIG. 2, which window is preferably a constituent part of the front region (16) (see, e.g, FIGS. 4 to 6) of the receiving apparatus (1). A cavity (15) for receiving the functional unit (2) can be formed behind the window. If the functional unit (2) is a line laser device, the laser beam which is emitted by the line laser device can be directed through the window onto the projection target and therefore form a guide line for working with the power tool (3).

Figure 3:
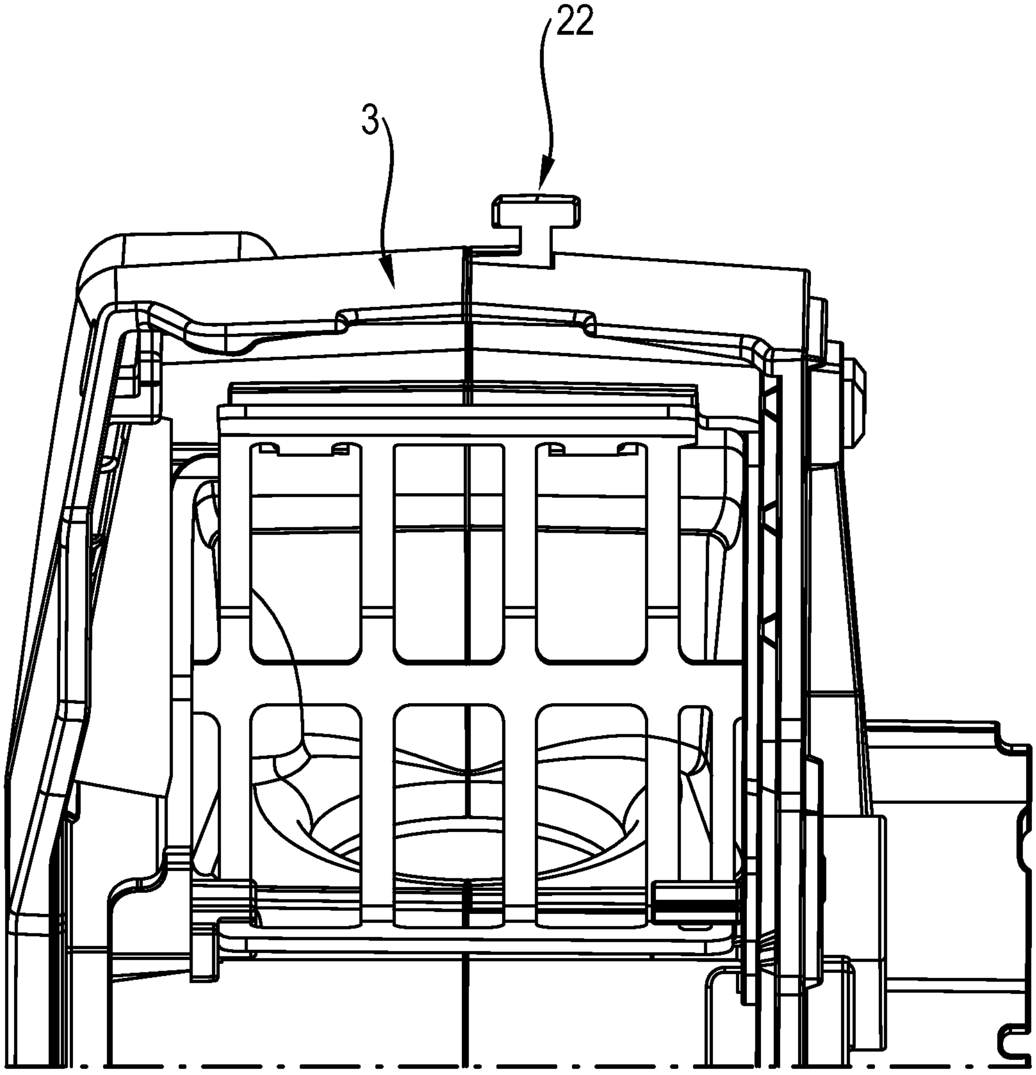
FIG. 3 shows a view of a preferred arrangement of the pin on the power tool

FIG. 3 shows a view of a possible arrangement of the pin (22) on the power tool (3).

Figure 4:
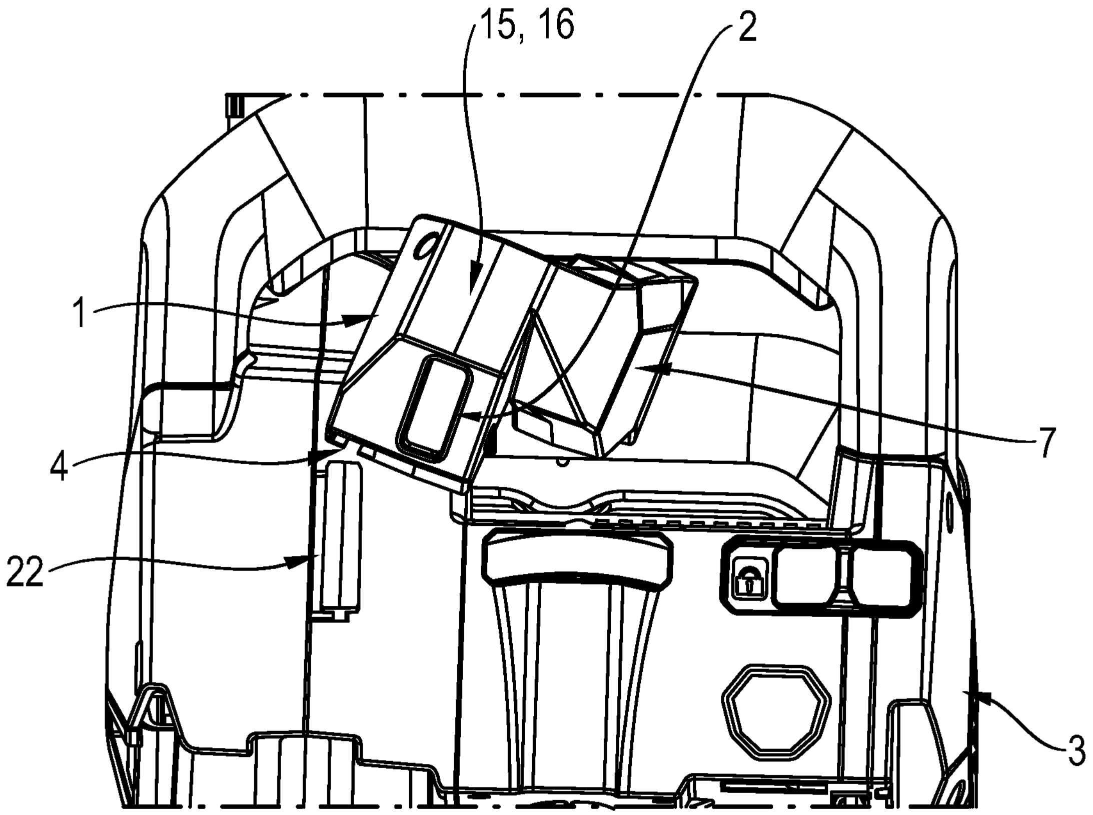
FIG. 4 shows an illustration of exemplary attachment of the receiving apparatus to the power tool

FIG. 4 shows an illustration of exemplary attachment of the receiving apparatus (1) to the power tool (3). As illustrated in FIG. 4, the body of the power tool (3) can be spanned by a bow-shaped handle beneath which the receiving apparatus (1) can be attached. FIG. 4 shows a receiving apparatus (1) during fitting to the power tool (3). In this case, the pin (22) of the power tool (3) is inserted into the cutout (4) on the receiving apparatus (1), wherein this insertion is possible only in one direction owing to the preferred tapering of the cutout (4) and the pin (22). FIG. 4 illustrates, in particular, a front view of the power tool (3) with operator control elements. In particular, FIG. 4 shows an end side of the power tool (3) on which the pin (22) for forming the dovetail connection can be arranged. FIG. 4 also shows the front region (16) of the receiving apparatus (1) that has a trapezoidal basic shape in a side view of the receiving apparatus. The front part (16) of the receiving apparatus (1) preferably comprises a cavity (15) in which the functional unit (2) can be accommodated. In the fitted state, the receiving apparatus (1) preferably bears against the power tool (3) by way of a side (8) which faces the power tool (3) (see, e.g., FIG. 7), while a side (7) of the receiving apparatus (1) that is averted from the power tool (3) points away or off from the power tool (3) (see, e.g., FIG. 6).

Figure 5:
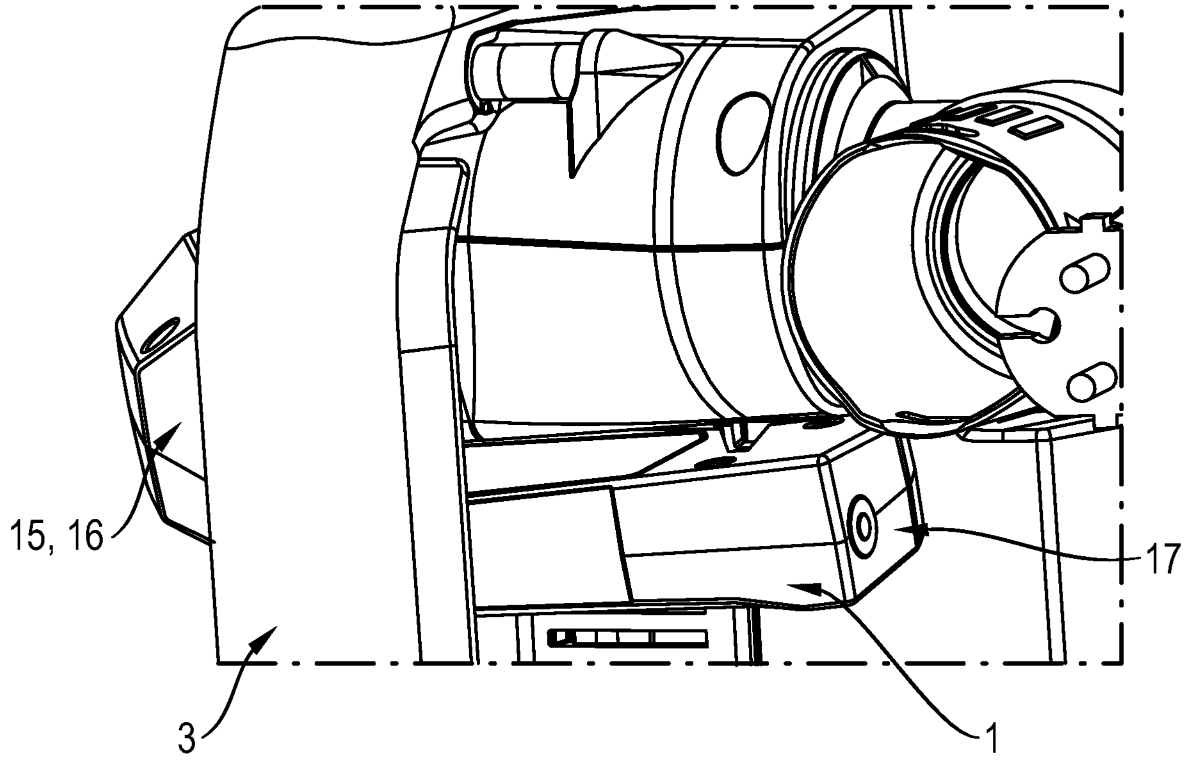
FIG. 5 shows an illustration of a preferred refinement of the receiving apparatus

FIG. 5 shows an illustration of a preferred refinement of the receiving apparatus (1). In FIG. 5, the receiving apparatus (1) is not yet fully fitted on the power tool (3). In particular, FIG. 5 shows the position of the receiving apparatus (1) in relation to a handle of the power tool (3). The receiving apparatus (1) can comprise a switch (17) for controlling the functional unit (2). The functional unit (2) can be, for example, switched on or off by way of said switch (17). The switch (17) is preferably present in a rear region of the receiving apparatus (1). The rear region of the receiving apparatus (1) is preferably averted from the working direction of the power tool (3).

Figure 6:
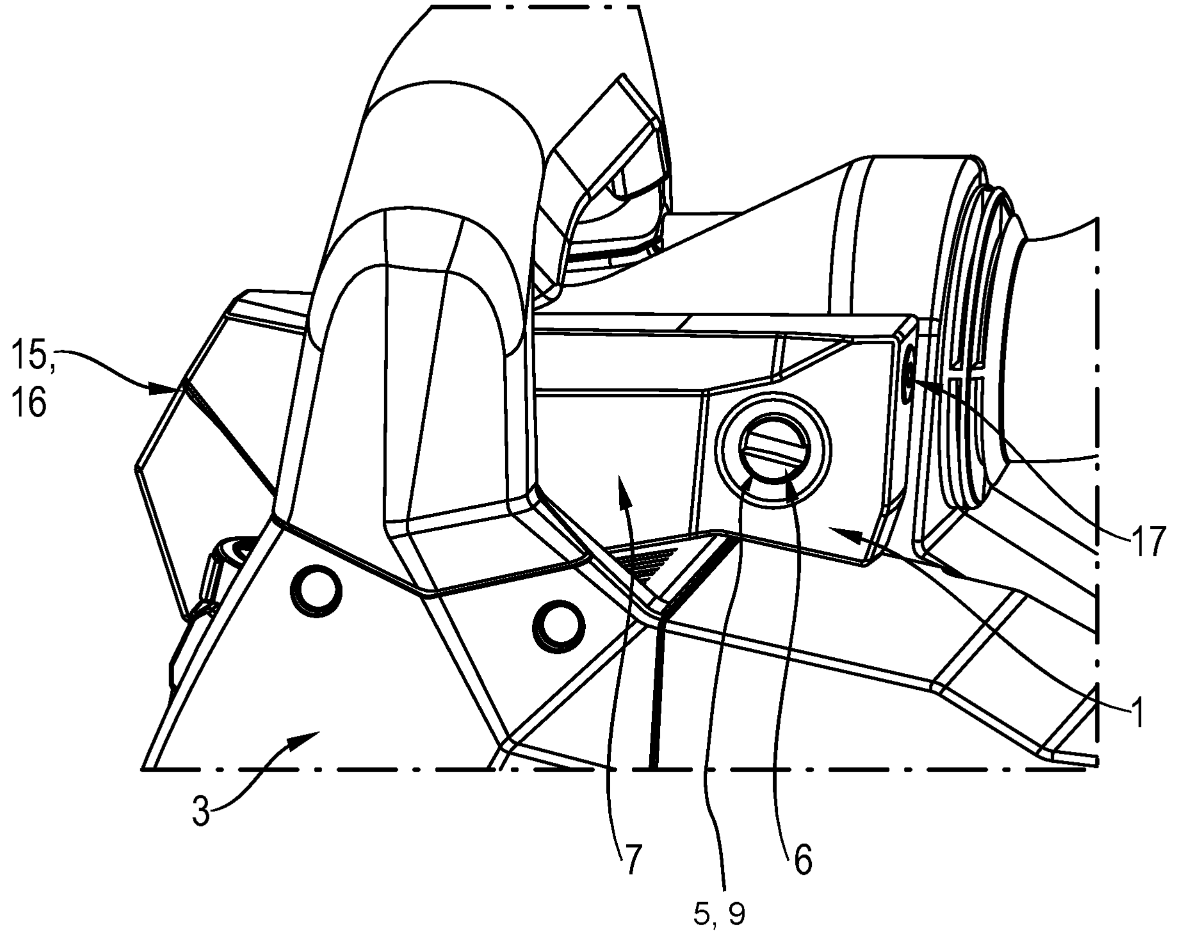
FIG. 6 shows an illustration of a preferred refinement of the receiving apparatus in the fitted state

FIG. 6 shows a further illustration of a preferred refinement of the receiving apparatus (1) in the fitted state on the power tool (3), wherein FIG. 6 illustrates, in particular, a side view of the fitted receiving apparatus (1). FIG. 6 shows, in particular, the side (7) of the receiving apparatus (1) that is averted from the power tool (3) in which an opening (5) is made. On the side (7) of the receiving apparatus (1) that is averted from the power tool (3), the opening (5) is preferably designed as a bore (9) which preferably has a substantially circular base area. The insert part (6) which can be moved from a fastened to an unfastened state by rotation is preferably present in the bore (9) or the opening (5). The rotational movement of the insert part (6) can preferably be transmitted to the insert part (6) using the slot (13) of the insert part (6) (see, e.g., FIG. 1). For example, a coin or another tool which is usually readily available on construction sites can be used for this purpose.

Figure 7:
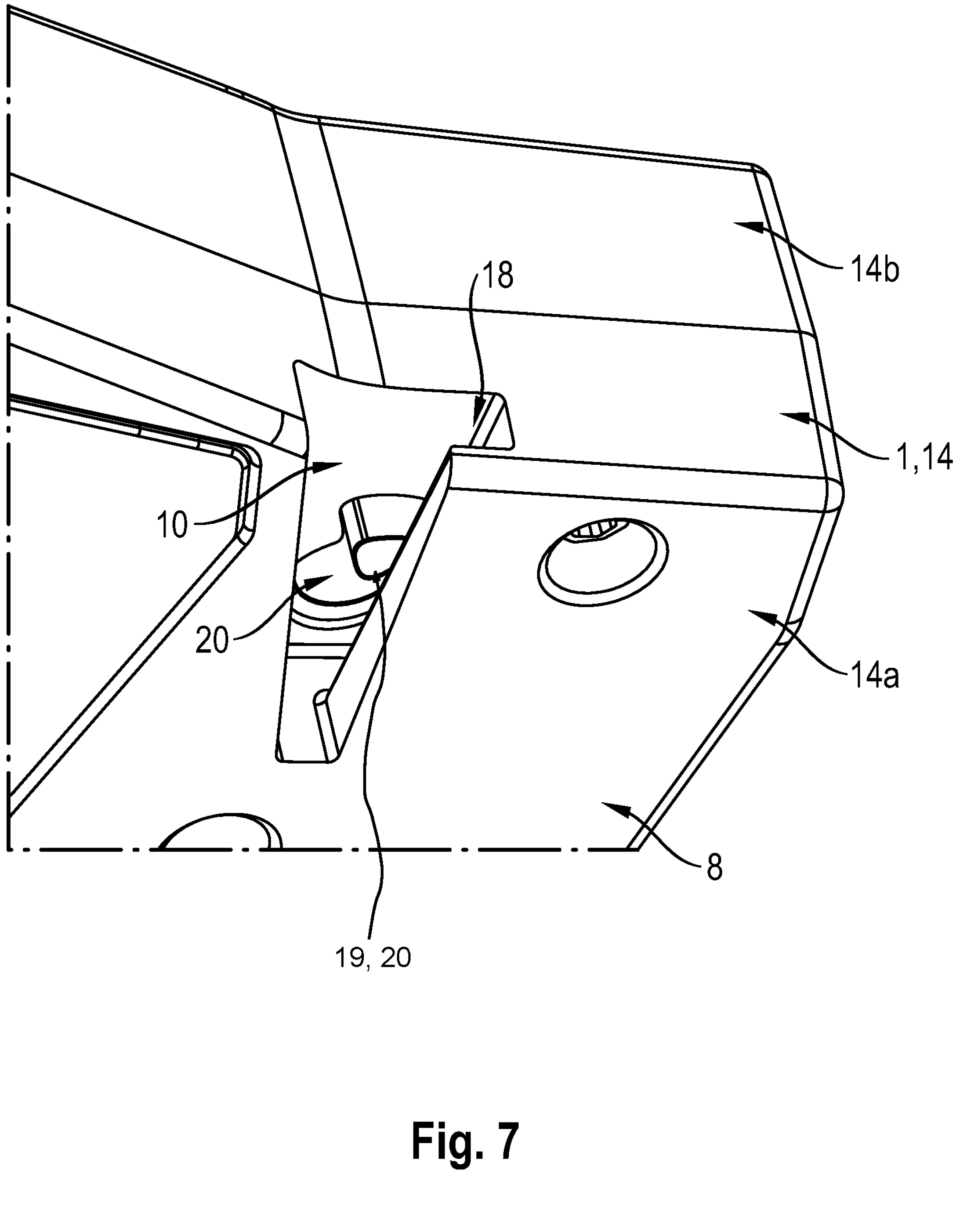
FIG. 7 shows an illustration of the slot of a preferred embodiment of the receiving apparatus

FIG. 7 shows an illustration of the slot (10) of a preferred embodiment of the receiving apparatus (1). The slot (10) preferably comprises two side or boundary edges which preferably do not run parallel to one another. The slot (10) further comprises an undercut (18) which covers part of the slot (10). In particular, the undercut (18) at least partially covers an inner region of the receiving apparatus (1) that comprises the centering disk segment (19, only partially illustrated). The centering disk segment (19) is preferably arranged in the opening (5) of the apparatus (1), wherein the centering disk segment (19) has a guide opening (20) in its center. The centering disk segment (19) preferably has a ring segment (21), wherein the ring segment (21) of the centering disk segment (19) covers approximately ⅔ of a full circle. It is preferred within the meaning of the invention for the centering disk segment (19) to comprise in its center a guide opening (20) around which the ring segment (21) extends in an angular range of 200 to 280 degrees, preferably 220 to 260 degrees, particularly preferably between 230 and 250 degrees and most preferably at approximately 240 degrees. The remaining region of the inner cavity of the centering disk segment (19) preferably remains free, wherein this free portion of the centering disk segment (19) preferably makes up an angular range of 80 to 160 degrees, preferably of 100 to 140 degrees, particularly preferably of 110 to 130 degrees and most preferably of approximately 120 degrees. In other words, the free portion of the centering disk segment (19) preferably makes up a portion of approximately ⅓ of a full circle, wherein the raised portion (12) of the insert part (6) is designed such that the raised portion (12) in the free third of a full circle of the centering disk segment (19) is movable.

FIG. 7 further shows that the basic body (14) of the receiving apparatus (1) is formed from two halves (14*a*, 14*b*), wherein a first half (14*a*) faces the power tool (3) in the fitted state, while a second half (14*b*) is averted from the power tool (3) in the fitted state of the receiving apparatus (1).

Figure 8:
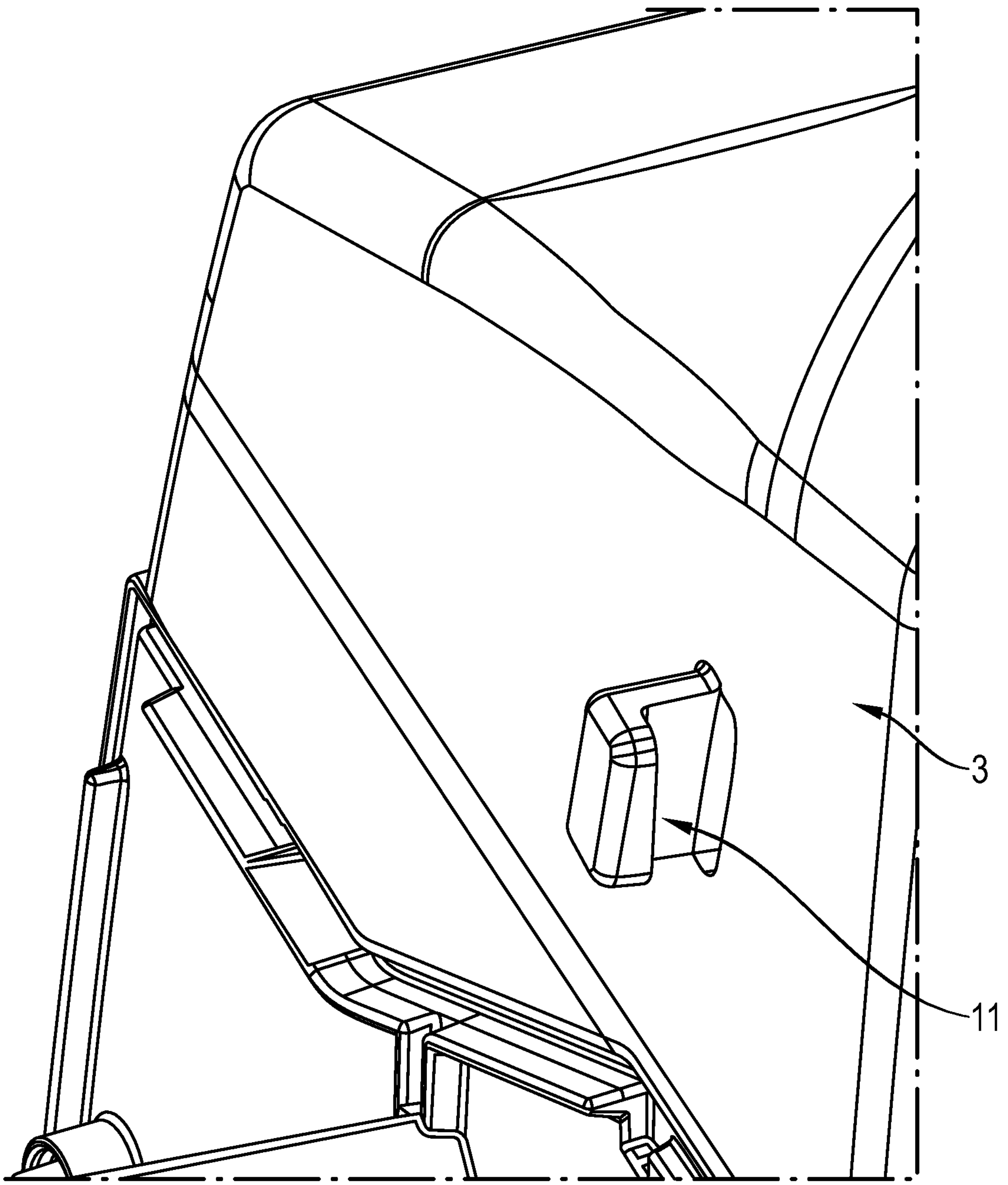
FIG. 8 shows an illustration of a preferred refinement of the hook on the power tool

FIG. 8 shows an illustration of a preferred refinement of the hook (11) on the power tool (3).

Figure 9:
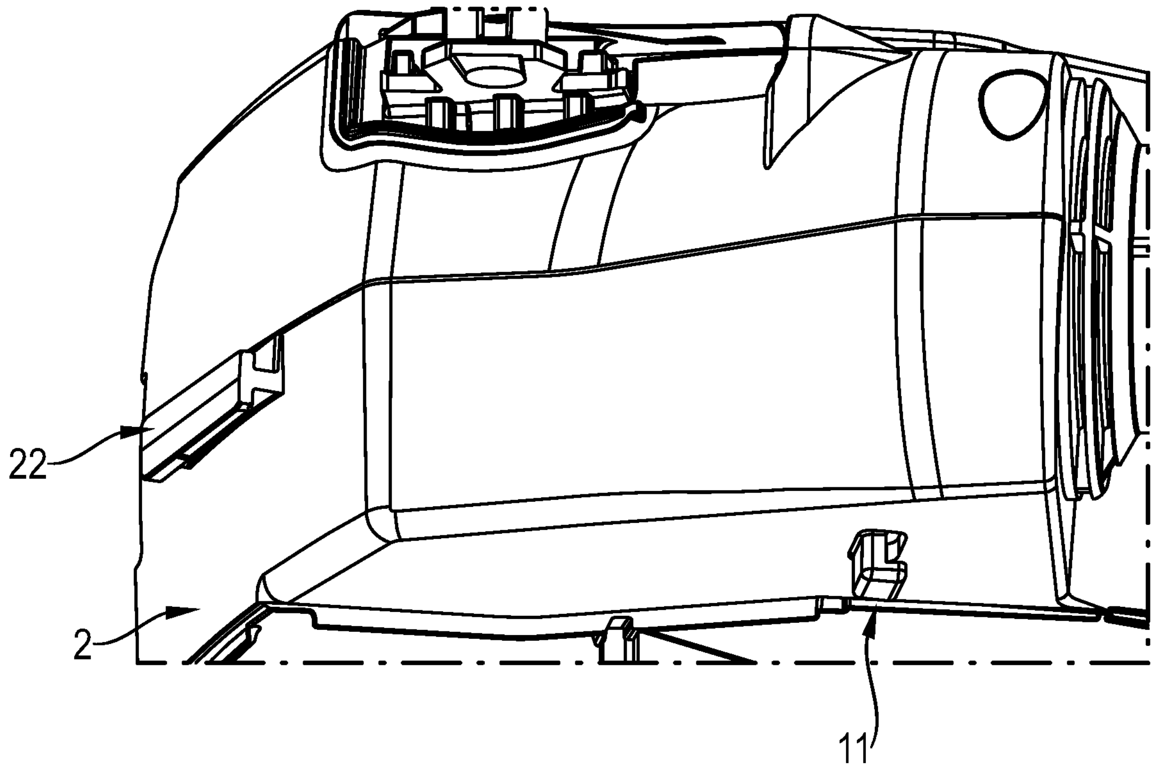
FIG. 9 shows an illustration of a preferred refinement of the power tool with a pin and a hook

FIG. 9 shows an illustration of a preferred refinement of the power tool (3) with a pin (22) and a hook (11).

Figure 10:
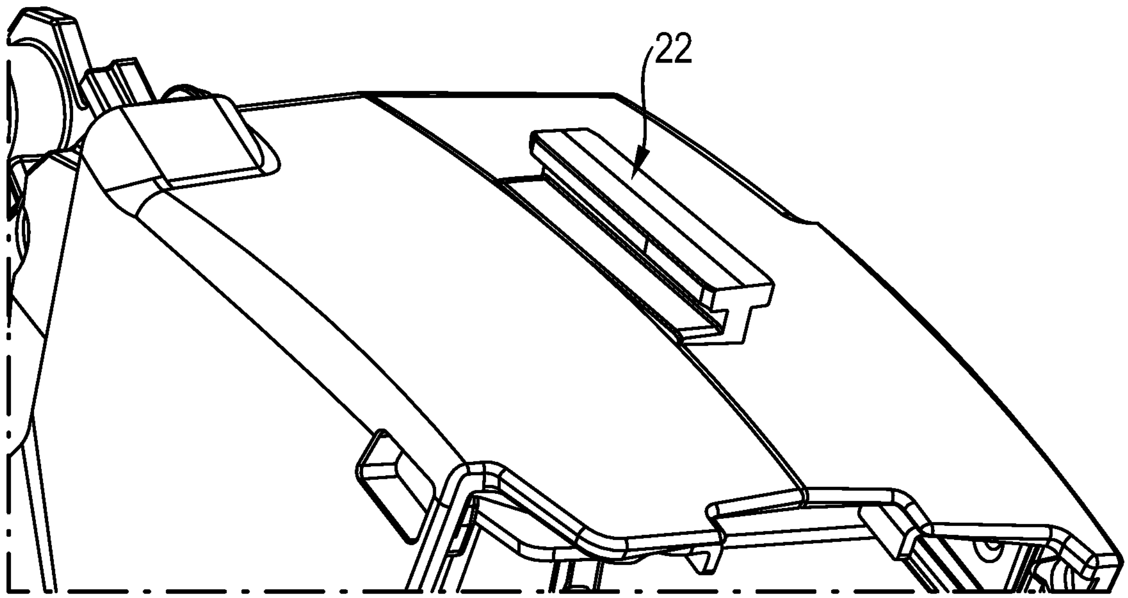
FIG. 10 shows a view of a preferred arrangement of the pin on the power tool

FIG. 10 shows a view of a preferred arrangement of the pin (22) on the power tool (3).

LIST OF REFERENCE SIGNS

1 Receiving apparatus
2 Functional unit
3 Power tool
4 Cutout for forming a dovetail connection/dovetail cutout
5 Opening
6 Insert part
7 Side of the receiving apparatus that is averted from the power tool
8 Side of the receiving apparatus that faces the power tool
9 Bore
10 Slot for receiving the hook of the power tool
11 Hook
12 Raised portion of the insert part
13 Slot of the insert part
14 Basic body of the receiving apparatus
14*a*, 14*b* Side halves of the basic body of the receiving apparatus
15 Cavity for receiving the functional unit
16 Front region of the apparatus
17 Switch for controlling the functional unit
18 Undercut
19 Centering disk segment
20 Guide opening
21 Ring segment of the centering disk segment
22 Pin on the power tool for forming the dovetail connection

What is claimed is:

1. An apparatus for receiving a functional unit for a power tool, the apparatus fastenable to the power tool and comprising:
- a cutout for forming a dovetail connection;
- a fastening mechanism including an opening in the apparatus and
- a rotatable insert part insertable into the opening, wherein the opening is formed by a bore on a side averted from the power tool; and
- a slot for receiving a hook on the power tool, the slot being on a side facing the power tool, and, in a fastened state, the hook is in engagement with a raised portion of the insert part for fastening the apparatus to the power tool.

2. The apparatus as recited in claim 1 wherein the insert part is rotatably movable from the fastened to an unfastened state.

3. The apparatus as recited in claim 1 wherein the insert part includes a slot for rotating the insert part in the opening of the apparatus, wherein the slot is arranged on a side of the insert part averted from the raised portion.

4. The apparatus as recited in claim 1 wherein the insert part has a cylindrical basic body.

5. The apparatus as recited in claim 1 further comprising a basic body formed by two corresponding parts.

6. The apparatus as recited in claim 1 further comprising a cavity for receiving the functional unit for the power tool in a front region of the apparatus.

7. The apparatus as recited in claim 6 wherein the front region of the apparatus has a trapezoidal basic shape.

8. The apparatus as recited in claim 1 wherein the cutout for forming a dovetail connection is present on a rear side of the front region of the apparatus.

9. The apparatus as recited in claim 1 wherein the cutout tapers.

10. The apparatus as recited in claim 1 wherein the slot for receiving the hook of the power tool has non-parallel boundary edges.

11. The apparatus as recited in claim 1 wherein a portion of the slot on the side facing the power tool is covered by an undercut.

12. The apparatus as recited in claim 1 wherein a centering disk segment is arranged in the opening of the apparatus, wherein the centering disk segment has a guide opening, wherein a ring segment of the centering disk segment covers ⅔ of a full circle.

13. The apparatus as recited in claim 12 wherein the raised portion of the insert part is designed such that the raised portion is movable into a free ⅓ of the full circle of the centering disk segment.

14. A method for fastening a receiving apparatus for a functional unit to a power tool, the method comprising the following steps:
- providing a receiving apparatus in an unfastened state, wherein the unfastened state of the receiving apparatus is defined by a position of an insert part in the receiving apparatus;
- inserting a pin of the power tool into a cutout of the receiving apparatus;
- inserting a hook of the power tool into a slot of the receiving apparatus;
- rotating the insert part within the receiving apparatus, so that the receiving apparatus is moved from an unfastened to a fastened state and a connection between the power tool and the receiving apparatus is obtained.

15. An apparatus for receiving a functional unit for a power tool, the apparatus fastenable to the power tool and comprising:
- a fastening mechanism including an opening in the apparatus and
- a rotatable insert part insertable into the opening, wherein the opening is formed by a bore on a side averted from the power tool; and
- a slot for receiving a hook on the power tool, the slot being on a side facing the power tool, and, in a fastened state, the hook is in engagement with a raised portion of the insert part for fastening the apparatus to the power tool;
- wherein the insert part includes a slot for rotating the insert part in the opening of the apparatus, wherein the slot is arranged on a side of the insert part averted from the raised portion.

16. An apparatus for receiving a functional unit for a power tool, the apparatus fastenable to the power tool and comprising:

a fastening mechanism including an opening in the apparatus and a rotatable insert part insertable into the opening, wherein the opening is formed by a bore on a side averted from the power tool;

a slot for receiving a hook on the power tool, the slot being on a side facing the power tool, and, in a fastened state, the hook is in engagement with a raised portion of the insert part for fastening the apparatus to the power tool; and a cavity for receiving the functional unit for the power tool in a front region of the apparatus, wherein the front region of the apparatus has a trapezoidal basic shape.

* * * * *